J. M. ALLEN.
ELECTRODE FOR SECONDARY OR STORAGE BATTERIES.
APPLICATION FILED DEC. 1, 1919.
1,365,880.
Patented Jan. 18, 1921.
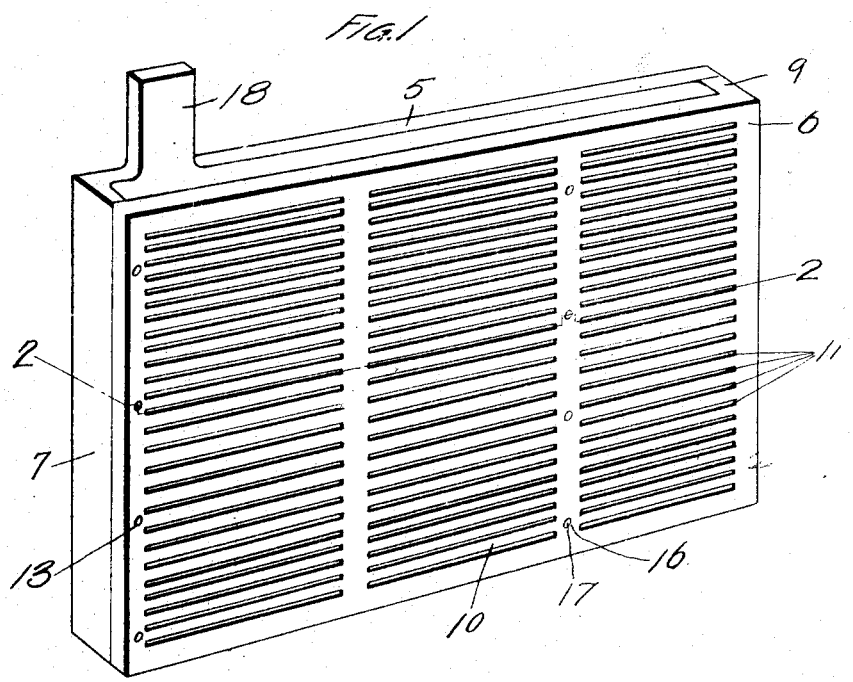
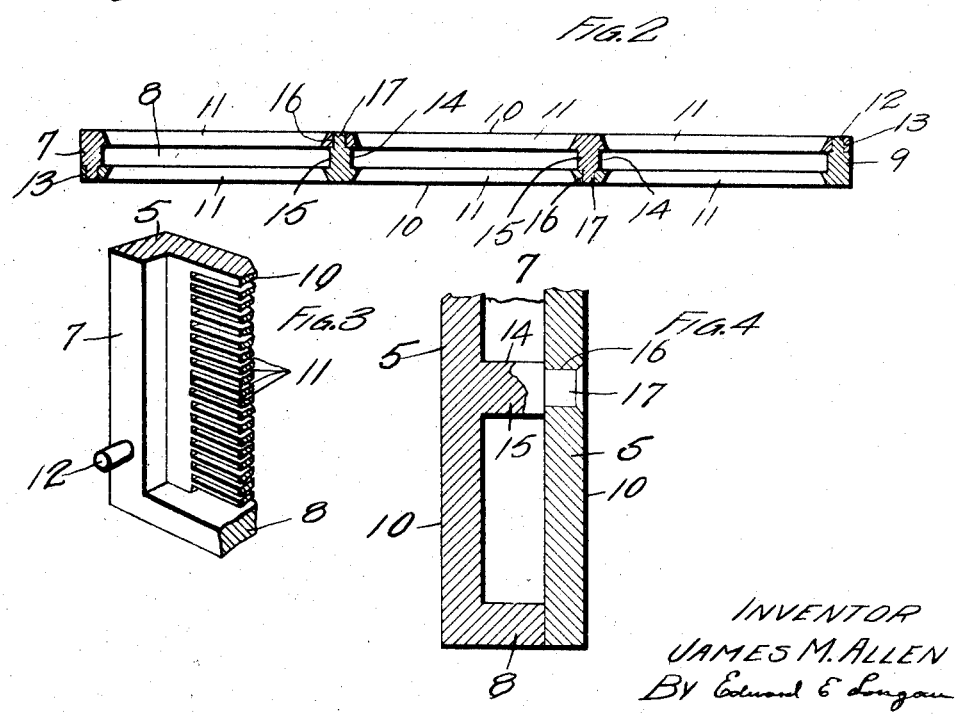
INVENTOR
JAMES M. ALLEN
BY Edward E. Longan
ATTY.

UNITED STATES PATENT OFFICE.

JAMES M. ALLEN, OF ST. LOUIS, MISSOURI, ASSIGNOR, BY DIRECT AND MESNE ASSIGNMENTS, TO SAID JAMES M. ALLEN, FRED P. SMITH, AND FREDERICK D. TUCKER, TRUSTEES FOR THE SMITH-ALLEN BATTERY COMPANY.

ELECTRODE FOR SECONDARY OR STORAGE BATTERIES.

1,365,880.  Specification of Letters Patent.  Patented Jan. 18, 1921.

Application filed December 1, 1919. Serial No. 341,639.

*To all whom it may concern:*

Be it known that I, JAMES M. ALLEN, a citizen of the United States of America, and a resident of the city of St. Louis and State of Missouri, have invented certain new and useful Improvements in Electrodes for Secondary or Storage Batteries, of which the following is a specification containing a full, clear, and exact description, references being had to the accompanying drawings, forming a part thereof.

My invention relates to electrodes for storage batteries, and has for its primary object an electrode composed of two sections being burned or welded together so that three sides thereof will be closed, and projections formed on each of the sections, said projections adapted to extend through the opposite section and be welded therein, and an oxid compressed within the two sections.

A further object is to construct an electrode for storage batteries of two sections, each of the sections being provided with projections which fit through the opposite section and with ribs extending on three sides thereof so as to form a pocket, each section of the electrode being provided with a series of slits so that the electrolyte can have access to the metallic filler placed within the assembled electrode.

In the drawings,

Figure 1 is a perspective view of my electrode,

Fig. 2 a sectional view taken on the line 2—2 of Fig. 1,

Fig. 3 an enlarged fragmental perspective view of a corner of one of the sections of the electrode, and Fig. 4 an enlarged sectional view through the electrodes showing the manner of connecting same.

In carrying out my invention, I provide an electrode composed of sections 5 and 6, the electrode 5 being provided along two of its edges with the projecting flanges 7 and 8; the electrode 6 is provided along one of its edges with a projecting flange 9.

The electrodes 5 and 6 are formed solid, that is of one sheet of material and through the face 10 of each section are formed a plurality of slits 11. These slits are preferably formed in section on a milling machine by using a series of slitting saws with washers interposed between.

On the flanges 7 and 9 are formed cylindrical projections 12, these projections entering the bores 13 formed in the opposite sections. Intermediate the ends of the plates and staggered as in Fig. 2 are projections 14, these projections being cylindrical in form and provided with an enlargement 15. This enlargement is of the same length as the flanges 7 and 9. The plates 5 and 6 are also provided with openings 16 through which the ends 17 of the projections 14 pass, the ends 17 being of less diameter than the enlargement 15.

The portion 5 of the electrode is provided with a vertical projecting member 18 which is secured to the binding post or connecting member of a storage battery in any well known manner.

In the construction of my device I first form the plates 5 and 6. The slots 11 are then cut into each of these plates in any well known manner, the openings or bores 13 being already cast in each of the plates or sections. The sections are then assembled and securely welded together, after which the active material, such as an oxid is placed within the pocket formed between the two plates and securely pressed therein.

This active material may be introduced as a powder, in which case it is necessary to give the plate a liquid treatment, or it may be placed in the pocket in a plastic or a liquid form. By means of the welding process made use of and the connecting projections formed on the plates, the buckling thereof between the two sections is eliminated.

Having fully described my invention, what I claim is:—

1. An electrode for storage batteries comprising a pair of plates, said plates provided with right angular ribs projecting from three edges thereof, slits formed in each of said plates and projections formed on each of the ribs for securing the sections together.

2. An electrode for storage batteries comprising a pair of slitted plates, a flange formed on one edge of one plate, a projection formed on one of the plates for securing the same to a binding post, a flange formed on the edge and bottom of the other plate, a series of projections formed on each flange, a series of perforations formed in each plate and opposite the projections, and a metallic filler compressed between the plates when assembled.

3. An electrode for storage batteries comprising two plates spaced apart, one of said plates being provided with an integral flange on one of its edges and its bottom, the flange along the end being provided with integral studs and the other plate being provided along one end with an integral flange, said flange being provided with integral studs and on its opposite end with openings adapted to receive the studs formed on the edged flange of the first mentioned plate, each of said plates being provided with coinciding slits, and the flanges on said plates adapted to close an electrode on both ends and the bottom so as to form a housing open at the top for the reception of a metallic filler, and a series of studs formed on said plates intermediate their ends for securing the intermediate portion of said plates together.

In testimony whereof I have signed my name to this specification.

JAMES M. ALLEN.